United States Patent [19]
Bauer et al.

[11] Patent Number: 5,550,981
[45] Date of Patent: Aug. 27, 1996

[54] DYNAMIC BINDING OF NETWORK IDENTITIES TO LOCALLY-MEANINGFUL IDENTITIES IN COMPUTER NETWORKS

[75] Inventors: Eric Bauer, Freehold; Russel W. Schaffer, Ocean Grove, both of N.J.

[73] Assignee: AT&T Global Information Solutions Company, Dayton, Ohio

[21] Appl. No.: 263,092

[22] Filed: Jun. 21, 1994

[51] Int. Cl.⁶ ................................................. G06F 15/16
[52] U.S. Cl. ................ 395/200.06; 364/280; 364/285.4; 364/286.4; 364/DIG. 1; 364/286.5; 395/800
[58] Field of Search ........................... 395/800, 726–729, 395/188.01, 200.06, 600

[56] References Cited

U.S. PATENT DOCUMENTS

| | | | |
|---|---|---|---|
| 4,714,989 | 12/1987 | Billings ..................................... | 395/700 |
| 5,062,040 | 10/1991 | Bishop et al. ........................... | 395/650 |
| 5,218,697 | 6/1993 | Chung ...................................... | 395/650 |
| 5,263,157 | 11/1993 | Janis ........................................ | 395/200 |
| 5,381,535 | 1/1995 | Gum et al. ............................... | 395/375 |

OTHER PUBLICATIONS

Pro Comm Plus User Manual, Datastorm Technologies, Inc. 1987/1990 pp. 202–203.
Unix System V Release 4, Programmer's Reference Manual, Oct. 1989, see entire document.

*Primary Examiner*—Mehmet B. Geckil
*Attorney, Agent, or Firm*—George H. Gates

[57] ABSTRACT

A method and apparatus for binding network identities to locally-meaningful identities in a computer network is disclosed. A client computer is connected to a server computer that performs various functions requested by an operator of the client computer. The server computer assigns a temporary locally-meaningful identity to the operator of the client computer, and receives and responds to requests to perform functions from the client computer. The server computer triggers an ownership fault in response to a particular request received from the client computer. The particular request that triggers the ownership fault may be a request to create a file, a request to create a directory, a request to take ownership of an existing file, a request to take ownership of an existing directory, or other function. In response to the ownership fault, the server computer assigns a permanent local identity to the network identity associated with the operator of the client computer in response to the ownership fault depending on its security policy. The permanent local identity may be retrieved from a pool of previously allocated locally-meaningful identities maintained by the server computer, or the permanent local identity may be created as needed. Once the assignment occurs, the server computer maps the permanent local identity to the network identity by updating its records.

30 Claims, 2 Drawing Sheets

DYNAMIC BINDING OF NETWORK IDENTITIES TO LOCALLY-MEANINGFUL IDENTITIES IN COMPUTER NETWORKS

BACKGROUND OF THE INVENTION

1. Field of the Invention

The present invention generally relates to network operating systems for computers, and in particular, to a method and apparatus for dynamically binding network identities to locally-meaningful identities on a particular computer in a network of computers.

2. Description of Related Art

Local area networks (LANs) allow personal computers (PCs) to share resources typically located at a host computer, such as files and printers. These types of networks are generally referred to as client/server networks, wherein the PCs are considered "clients" whose requests are processed by the host "server".

Network operating systems are increasingly making use of "network-wide" user identities in which a "network user", such as John Smith, is given a single network-wide identity that can be used to uniquely identify that user anywhere in the network. Network-wide user identities simplify administrative and other tasks by permitting a single network-wide "name" to be used to identify a particular user regardless of network topology or organization. However, server computers typically require a separate locally-meaningful user identity or account to track ownership and usage of resources local to the server computer. For example, UNIX systems use the locally-meaningful integer "User Identifier" or simply "uid" to track ownership of files, directories and processes.

Because the set of valid "network users" can be vastly larger than the number of individual users that can be adequately supported on a particular server computer, it is impractical to create a locally-meaningful identity for every network user on each and every server on the network. For example, a university may have tens of thousands of students who are each distinct "network users", but creating tens of thousands of local user accounts on a number of different server computers is impractical on all but the largest computers.

There are a number of solutions to the problem. For example, one can manually create a local identity or account for every network user on each and every server computer that the user plans to use, and manually bind the user's network identity to each and every one of these locally meaningful user accounts. This solution requires that the administrator know in advance every server that each user will wish to use.

Over time, usage patterns are bound to change and users will no doubt periodically stumble across servers where they cannot perform network operations because they do not have local user accounts. At that point, a user would have to contact the system administrator for that server to have a local identity created and bound to the user's network identity.

Another solution is to map all network users to a catch-all local user account on each server, for example, by mapping all network identities to a local identity called "guest." While this is technically simple, because it essentially bypasses user account mechanisms by homogenizing all users into a single user account, it creates a virtually unmanageable situation on servers. Since all files, directories and resources created and owned by network users would be identified as being owned by a local identity of "guest," it is very difficult for the administrator to determine who actually owns the files, directories or resources on the server. Without knowing the owner of a file (for example), it is difficult to accurately allocate the costs associated with that resource to the individual owner or user.

Thus, there is a need in the art for improved techniques of assigning network identities to locally meaningful identities.

SUMMARY OF THE INVENTION

To overcome the limitations in the prior art described above, and to overcome other limitations that will become apparent upon reading and understanding the present specification, the present invention discloses a method and apparatus for binding network identities to locally-meaningful identities on computers in a network. A client computer is connected to a server computer that performs various functions requested by an operator of the client computer. If the server computer does not have a unique locally-meaningful identity for the operator of the client computer, then the server computer assigns a temporary local identity to the operator, and receives and responds to requests to perform functions from the client computer. The server computer triggers an ownership fault in response to a particular request received from the client computer. The particular request that triggers the ownership fault may be a request to create a file, a request to create a directory, a request to take ownership of an existing file, a request to take ownership of an existing directory, or other function. In response to the ownership fault, the server computer assigns a permanent local identity to the operator of the client computer in response to the ownership fault depending on its local security policy. The permanent local identity may be assigned from a pool of previously allocated locally-meaningful identities maintained by the server computer, or the permanent local identity may be created as needed (e.g., "on-the-fly"). Once the assignment occurs, the server computer maps the permanent local identity to the network identity by updating its records.

An object of the present invention is to provide an improved technique for assigning locally meaningful identities to network identities in client/server computer networks. Such locally-meaningful identities can then be used by server computers to track ownership and usage of resources.

Another object of the present invention is to provide a method for managing network access to server computers, when the bulk of such network access does not require the use of unique locally-meaningful identities. More specifically, the present invention allows a large population of network identities to be mapped to "guest" or temporary locally-meaningful identities on a server computer for normal access, and then assigning a permanent local identity to a network identity only when an "ownership fault" occurs. This technique avoids the impractical alternative of creating a locally-meaningful identity for every network user on each and every server on the network.

Still another object of the present invention is to provide a technique for assigning locally-meaningful identities or user accounts to network identities in a manner that eliminates the need for manual effort. As a result, the present invention greatly simplifies the efforts required of system administrators in managing network access to a server computer. Moreover, the owners of local resources, such as files, on a server computer can be readily identified.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention. More specifically, although the illustration of the preferred embodiment is presented in terms of a particular and identified hardware and software computer environment, those skilled in the art will recognize that the present invention has applicability to other environments as well.

Figure 1:
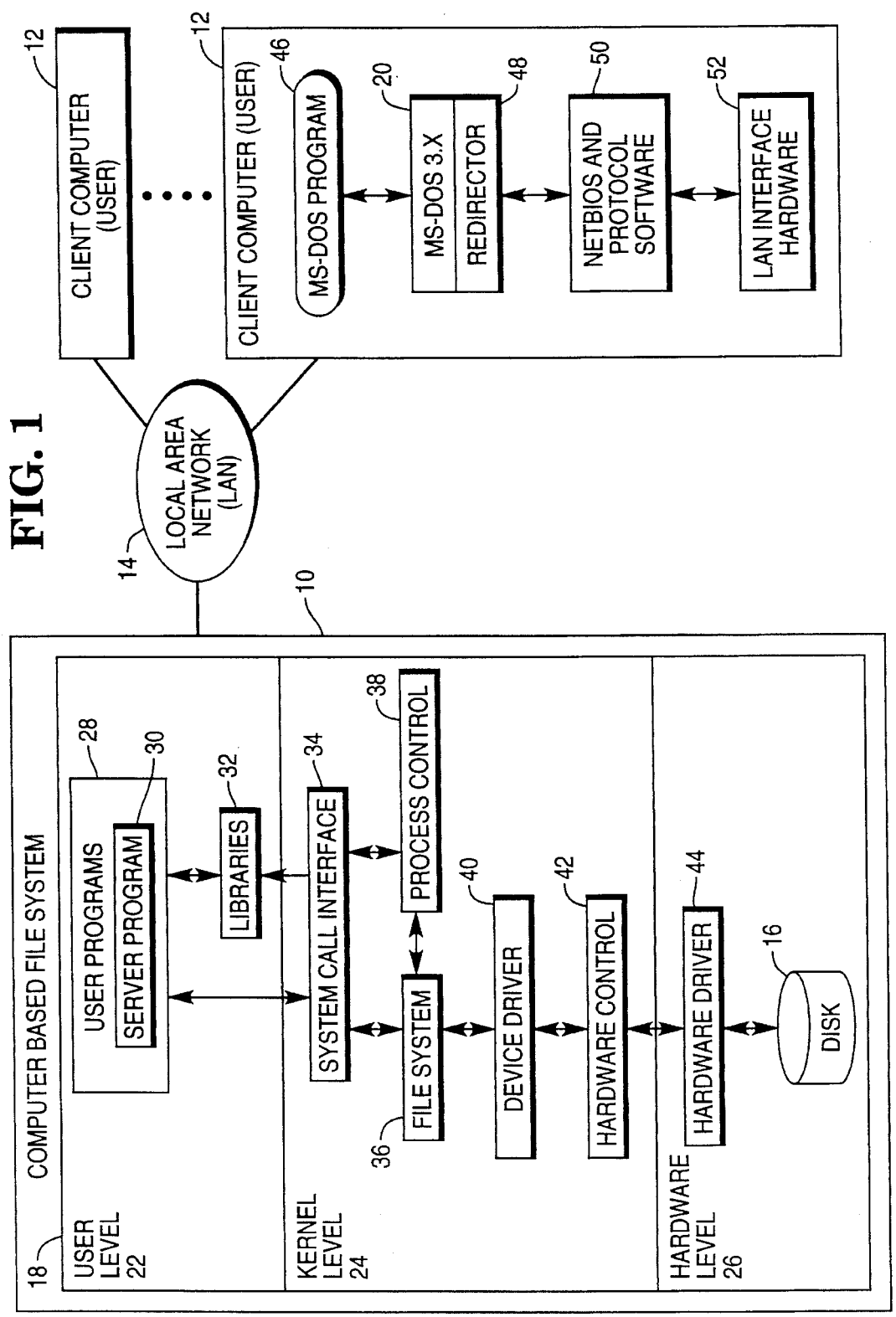
FIG. 1 illustrates a typical client/server computer network architecture.

FIG. 1 is a block diagram of an illustrative client/server system or network in which the present invention may be utilized. The network includes a server computer 10 connected to a plurality of client workstations or personal computers (PCs) 12 via a local area network (LAN) 14. The server computer 10 provides the client PCs 12 shared access to data stored on hard disk 16.

In one illustrative arrangement, the server computer 10 may be an AT&T System 3450™ computer running under the control of the UNIX® System V Release 4.0 operating system 18. Each of the client PCs 12 may operate under the control of the well-known MS-DOS® operating system or OS/2® operating system 20. The LAN 14 may be the AT&T STARLAN™ system.

The client PCs 12 and server computer 10 may use the AT&T StarGROUP™ system software. This StarGROUP™ system software allows MS-DOS and OS/2 client PCs 12 to transparently share data files across the LAN 14. The server computer 10 can support one or more large hard disks 16 that can be made available to client PCs 12 on the LAN 14.

The UNIX operating system 18 controlling the operation of the server computer 10 is divided into three layers, including a user level 22, a kernel level 24, and a hardware level 26. The user level 22 includes user programs 28 such as a server program 30 and libraries 32 that interface to client PCs 12 via LAN 14 to enable access to the desired data stored in disk 16. The kernel level 24 includes a system call interface 34, file system 36, process control subsystem 38, device driver 40, and hardware control 42, so that it interacts directly with the hardware level 26 providing common services to the user level 22 to insulate the user level 22 from hardware level 26 idiosyncrasies. The hardware level 26 includes a hardware device driver 44 and provides the operating system 20 with basic services needed by computer 10.

The system call interface 34 of the kernel level 24 represents the border between the user level 22 and the kernel level 24. The system call interface 34 converts user program calls into UNIX system calls. System calls look like ordinary function calls in C programs, and libraries 32 map these function calls to the primitives needed to enter the operating system in a well-known manner. The set of system calls includes those that interact with the process control subsystem 38 and those that interact with the file system 36.

Software 46 on the client PC 12 interacts with the server program 30 on the server computer 10 to allow access to the disk 16. Specifically, system calls by the software 46 that reference disk 16 are packaged into request messages by a redirector 48 and transmitted to the server program 30 by network software 50 and the LAN interface 52 over the LAN 14.

Figure 2:
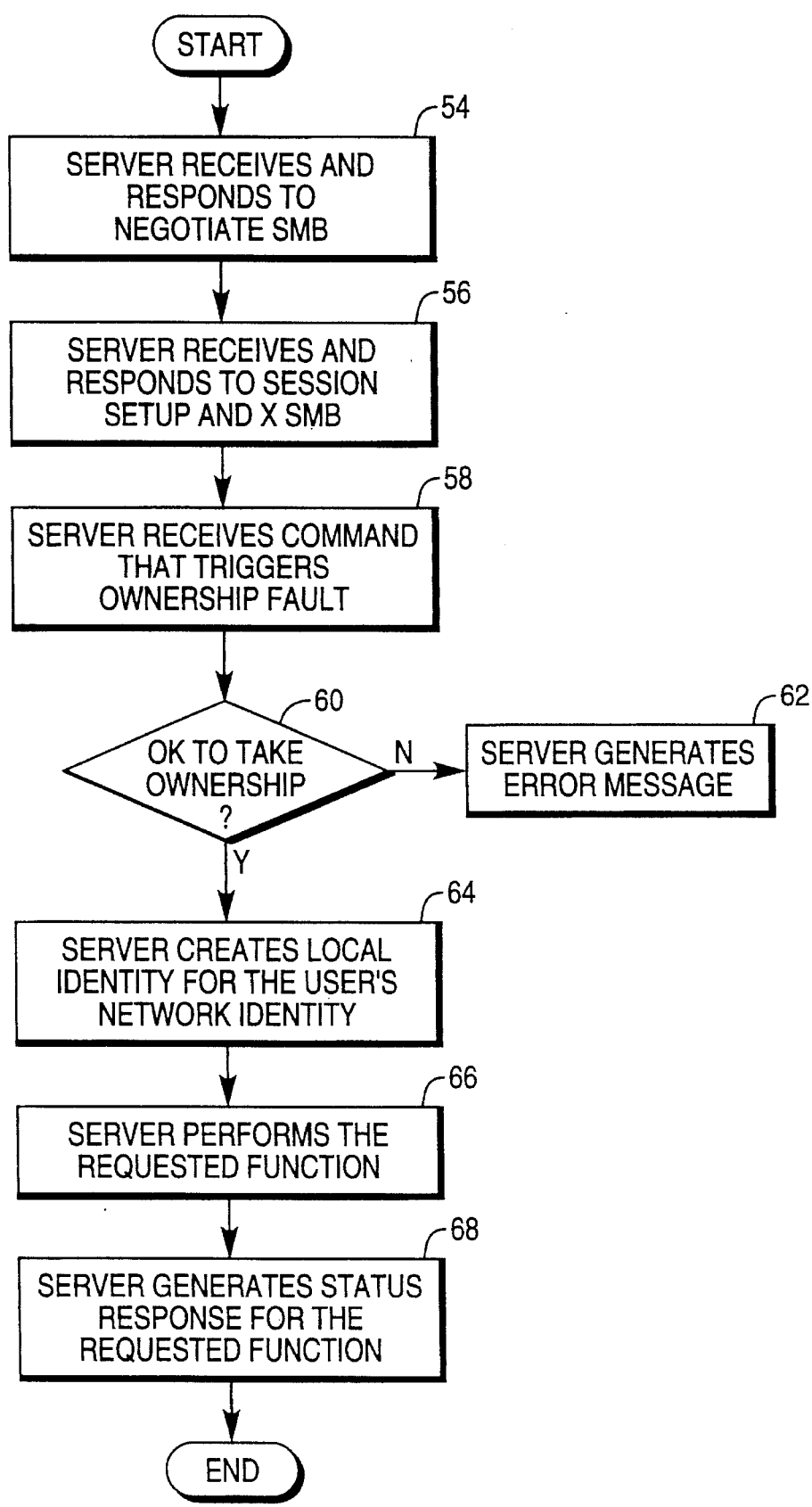
FIG. 2 is a flow chart illustrating the steps performed in the present invention.

FIG. 2 is a flow chart illustrating the steps performed in the present invention, wherein the the interaction of the server 10 and the client PCs 12 from the perspective of the server 10.

Block 54 represents the server 10 receiving and responding to a Negotiate Server Message Block (SMB) from the client PC 12, wherein the server 10 determines the protocol dialect to use with the client PC 12. The SMB protocol is a well-known protocol used in many networking products. The Negotiate SMB is the first SMB sent on a newly established virtual circuit. In the response to the Negotiate SMB, the server 10 sends information to the client PC 12 indicating its capabilities. The final step in the negotiation occurs when the client PC 12 sends a Session Setup And X SMB.

Block 56 represents the server 10 receiving and responding to the Session Setup And X SMB to authenticate an incoming network identity from the client PC 12. The Session Setup and X SMB includes the user's network-wide user name and the name of the administrative network domain that they belong to. For example, the user name might be "JOHNSMITH" and the domain name might be "ACCOUNTING." The server 10 consults its local mapping of network identities to locally-meaningful identities to retrieve the locally-meaningful identity to which the incoming network identity is mapped.

On a UNIX system, such a mapping might be implemented as a file that associates "username:domain" name pairs with locally-meaningful UNIX user accounts. For instance, "JOHNSMITH":"ACCOUNTING" might map to the locally-meaningful "smith" identity. The well-known UNIX system file "/etc/profile" maps the locally-meaningful name "smith" to the appropriate numeric uid for that particular UNIX system.

If the incoming network identity does not have an explicitly assigned locally-meaningful identity, then the server 10 assigns the user a "guest" locally-meaningful identity. Assume for the remainder of this discussion that the incoming network identity does not map explicitly to any locally-meaningful identity and that it has thus been assigned a "guest" locally-meaningful identity.

Block 58 represents the server 10 receiving a command from the user that triggers an "ownership fault". Such commands may include, for example, creating a new file or directory, taking ownership of an existing file or directory, or other functions. For example, the command could be a Create And X SMB to create or open a file or a directory, wherein the action taken by server 10 is dependent on the name of the object being opened, whether the object already exists, whether the user is authorized to access the named object, and other factors, and a file handle is returned that can be used by subsequent service calls to manipulate the file itself or the data within the file.

Since a file stored on the server 10 must be owned by a valid local identity (e.g., a UNIX uid) and the user's network identity has been mapped to the "guest" locally-meaningful identity, i.e., a locally-meaningful identity that is not assigned to a unique user, the server 10 triggers an ownership fault. Upon triggering the ownership fault, decision block 60 represents the server 10 deciding whether or not to permit the network user to proceed to take ownership of the resources based upon the security policy established on the server 10. The security policy may dictate how to handle ownership faults based upon the organization or administrative domain that the user belongs to, what network-wide groups the user belongs to, or any other set of characteristics. If the user is denied permission to take ownership of the resource, then block 62 represents the request failing and the server 10 returning an appropriate error message to the client PC 12.

If permission is granted to take ownership of the resource, then block 64 represents the server 10 assigning a pre-existing local identity from a pool of previously allocated locally-meaningful identities to the user. The pool of previously allocated locally-meaningful identities would allow a quick assignment of locally-meaningful identities on the occurrence of an ownership fault. For example, a server 10 may continuously maintain a pool of 5 spare locally-meaningful identity user accounts, e.g., "newuser1" through "newuser5." The first time that an ownership fault is triggered and cleared by granting the user permission to own the resource, then the server 10 assigns the "newuser1" local identity to the user. It is envisioned that the server 10 would thereafter create another "spare" locally-meaningful identity, e.g., "newuser6", so that the pool is maintained at an adequate level.

Alternatively, block 64 represents the server 10 creating a locally-meaningful identity for the user's network identity, for example, using the UNIX command "useradd". However, this technique would probably incur a real-time performance penalty, since the time to add a new local identity grows rapidly with the number of local identities assigned on some servers 10. Nevertheless, such a technique does not require using pre-existing accounts. Moreover, the local identity thus created may be more obviously related to the network identity than an arbitrary local identity, e.g., the network identity "ERICBAUER" may be mapped to a local identity of "ejb" rather than "newuser 1".

Regardless of how the locally-meaningful identity is assigned, block 64 also represents the server 10 updating its records to show that, henceforth, this particular user's network identity will be mapped to the newly created and/or assigned locally-meaningful identity. For example, the server 10 may use the UNIX library 32 call "getpwent" to retrieve the UNIX user identity (uid) and UNIX group identity (gid) assigned to the newly created local identity, and then update the data in the local user-specific data records on the server 10 to reflect this new UNIX uid.

Block 66 represents the server 10 performing the requested command that caused the ownership fault. For example, the server 10 may complete its response to the Create And X SMB by creating the requested file and using the UNIX system call "chown" to set the ownership of this file to the correct UNIX uid associated with the locally-meaningful identity. At this point, the UNIX system call "stat" should indicate that the file created in block 66 is owned by the locally-meaningful identity that was assigned to the incoming network identity in block 64.

Block 68 represents the server 10 generating a status response for the requested command to the client PC 12 indicating whether the operation was successful.

For the duration of this connection between the client PC and server computer, no further ownership faults should occur, because the network identity of the operator of the client PC is permanently mapped to the unique locally-meaningful identity. Moreover, during subsequent sessions between the operator and the server 10, the network identity of the operator should be authenticated by the server 10, because of the persistent mapping between the network identity and the locally-meaningful identity maintained by the server 10. Thus, the network identity of the operator should never again be assigned the "guest" or temporary local identity when accessing the server 10.

This concludes the description of the preferred embodiment of the invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An apparatus for binding network identities to locally-meaningful identities in a network comprised of a plurality of computers, the apparatus comprising:
   (a) a first computer;
   (b) a second computer coupled to the first computer for performing functions requested by an operator of the first computer, the second computer comprising:
      (1) means for assigning a temporary local identity to a username and domain name pair associated with the operator of the first computer;
      (2) means for receiving and responding to requests from the first computer to perform functions;
      (3) means for triggering an ownership fault in response to a particular request received from the assigned temporary local identity associated with the operator of the first computer; and
      (4) means for assigning a permanent local identity to the network identity associated with the operator of the first computer in response to the ownership fault.

2. The invention as set forth in claim 1 above, wherein the means for assigning (4) comprises means for retrieving the permanent local identity from a pool of previously allocated locally-meaningful identities.

3. The invention as set forth in claim 2 above, wherein the means for assigning (4) further comprises means for creating additional permanent locally-meaningful identities, so that the pool of previously allocated locally-meaningful identities is maintained at an adequate level.

4. The invention as set forth in claim 1 above, wherein the means for assigning (4) comprises means for creating the permanent local identity when the ownership fault occurs.

5. The invention as set forth in claim 4 above, wherein the permanent local identity is related to the username and domain name pair.

6. The invention as set forth in claim 1 above, wherein the second computer further comprises means for updating its records to reflect the assignment of the permanent local identity.

7. The invention as set forth in claim 6 above, wherein the means for updating comprises means for mapping the username and domain name pair to the permanent local identity.

8. The invention as set forth in claim 1 above, wherein the particular request is selected from a group comprising a request to create a file, a request to create a directory, a request to take ownership of an existing file, a request to take ownership of an existing directory, a request to print a file, a request to control a print job, and a request to examine a print job's status.

9. The invention as set forth in claim 1 above, wherein the second computer further comprises means for determining whether to perform the particular request according to a characteristic associated with the username and domain name pair.

10. The invention as set forth in claim 9 above, wherein the means for determining comprises means for denying the particular request and means for responding to the particular request by transmitting an appropriate error message to the first computer.

11. A method of binding network identities to locally-meaningful identities in a server computer, the method comprising the steps of:

(a) assigning a temporary local identity to a username and domain name pair associated with an operator of a client computer connected to the server computer;

(b) receiving and responding to requests from the client computer to perform functions;

(c) triggering an ownership fault in response to a particular request received from the assigned temporary local identity associated with the operator of the client computer; and (d) assigning a permanent local identity to the network identity associated with the operator of the client computer in response to the ownership fault.

12. The invention as set forth in claim 11 above, wherein the assigning step (d) comprises the step of retrieving the permanent local identity from a pool of previously allocated locally-meaningful identities.

13. The invention as set forth in claim 12 above, wherein the assigning step (d) further comprises the step of creating additional permanent locally-meaningful identities, so that the pool of previously allocated locally-meaningful identities is maintained at an adequate level.

14. The invention as set forth in claim 11 above, wherein the assigning step (d) comprises the step of creating the permanent local identity when the ownership fault occurs.

15. The invention as set forth in claim 14 above, wherein the permanent local identity is related to the username and domain name pair.

16. The invention as set forth in claim 11 above, further comprising the step of updating records in the server computer to reflect the assignment of the permanent local identity.

17. The invention as set forth in claim 16 above, wherein the step of updating comprises the step of mapping the username and domain name pair to the permanent local identity.

18. The invention as set forth in claim 11 above, wherein the particular request is selected from a group comprising a request to create a file, a request to create a directory, a request to take ownership of an existing file, a request to take ownership of an existing directory, a request to print a file, a request to control a print job, and a request to examine a print job's status.

19. The invention as set forth in claim 11 above, further comprising the step of determining whether to perform the particular request according to a characteristic associated with the username and domain name pair.

20. The invention as set forth in claim 19 above, wherein the step of determining comprises the steps of denying the particular request and responding to the particular request by transmitting an appropriate error message to the client computer.

21. A server computer, comprising:

(a) means for connecting to and communicating with a client computer;

(b) means for assigning a temporary local identity to a username and domain name pair associated with an operator of the client computer;

(c) means for receiving and responding to requests from the client computer to perform functions;

(d) means for triggering an ownership fault in response to a particular request received from the assigned temporary local identity associated with the operator of the client computer; and (e) means for assigning a permanent local identity to the network identity associated with the operator of the client computer in response to the ownership fault.

22. The invention as set forth in claim 21 above, wherein the means for assigning (e) comprises means for retrieving the permanent local identity from a pool of previously allocated locally-meaningful identities.

23. The invention as set forth in claim 22 above, wherein the means for assigning (e) further comprises means for creating additional permanent locally-meaningful identities, so that the pool of previously allocated locally-meaningful identities is maintained at an adequate level.

24. The invention as set forth in claim 21 above, wherein the means for assigning (e) comprises means for creating the permanent local identity when the ownership fault occurs.

25. The invention as set forth in claim 24 above, wherein the permanent local identity is related to the username and domain name pair.

26. The invention as set forth in claim 21 above, wherein the server computer further comprises means for updating its records to reflect the assignment of the permanent local identity.

27. The invention as set forth in claim 26 above, wherein the means for updating comprises means for mapping the username and domain name pair to the permanent local identity.

28. The invention as set forth in claim 21 above, wherein the particular request is selected from a group comprising a request to create a file, a request to create a directory, a request to take ownership of an existing file, a request to take ownership of an existing directory, a request to print a file, a request to control a print job, and a request to examine a print job's status.

29. The invention as set forth in claim 21 above, wherein the server computer further comprises means for determining whether to perform the particular request according to a characteristic associated with the username and domain name pair.

30. The invention as set forth in claim 29 above, wherein the means for determining comprises means for denying the particular request and means for responding to the particular request by transmitting an appropriate error message to the client computer.

* * * * *